US008548628B2

(12) United States Patent
Kock

(10) Patent No.: US 8,548,628 B2
(45) Date of Patent: Oct. 1, 2013

(54) SYSTEM AND METHOD FOR ALIGNING AND FOR CONTROLLING THE POSITION OF A ROBOT TOOL

(75) Inventor: Sönker Kock, Västeras (SE)

(73) Assignee: ABB AG, Mannheim (DE)

( * ) Notice: Subject to any disclaimer, the term of this patent is extended or adjusted under 35 U.S.C. 154(b) by 1325 days.

(21) Appl. No.: 12/158,605

(22) PCT Filed: Nov. 15, 2006

(86) PCT No.: PCT/EP2006/010945
§ 371 (c)(1),
(2), (4) Date: Sep. 18, 2008

(87) PCT Pub. No.: WO2007/079812
PCT Pub. Date: Jul. 19, 2007

(65) Prior Publication Data
US 2009/0076654 A1 Mar. 19, 2009

(30) Foreign Application Priority Data
Dec. 21, 2005 (DE) .......................... 10 2005 061 618

(51) Int. Cl.
*G05B 19/18* (2006.01)
*G05B 19/4061* (2006.01)
*G06F 19/00* (2011.01)

(52) U.S. Cl.
USPC ............. 700/255; 700/215; 700/177; 901/30; 901/45; 901/49

(58) Field of Classification Search
USPC ................ 700/187, 192, 245, 255, 159, 166, 700/175, 177, 178; 219/121.82, 121.83, 219/121.81, 121.78; 901/30, 41, 45, 49; 483/2
See application file for complete search history.

(56) References Cited

U.S. PATENT DOCUMENTS 5,093,552 A * 3/1992 Torii et al. ................ 219/121.83
7,283,889 B2 * 10/2007 Otsuki et al. ................... 700/186
(Continued)

FOREIGN PATENT DOCUMENTS
DE         101 63 392 A1      7/2003
DE     10 2004 026 185 A1    12/2005
(Continued)

OTHER PUBLICATIONS

* International Search report.
(Continued)

*Primary Examiner* — Christine Behncke
(74) *Attorney, Agent, or Firm* — Buchanan Ingersoll & Rooney PC

(57) ABSTRACT

The invention relates to a method and to a system for aligning and controlling the position of a robot tool, wherein a monitoring device is equipped with a detection unit and processing unit which co-operates with the control device of the robot and automatically determines the alignment of the robot tool by means of the detection unit by taking into account at least one pre-determined reference direction of the robot tool, in addition to at least one predetermined tolerance angle which defines a tolerance range for the at least one reference direction of the robot tool. The processing unit compares the determined alignment to the predetermined reference direction and/or to the tolerance values predetermined by the defined tolerance range and/or of the at least one tolerance range is not respected, the respective robot tool is disconnected and/or deactivated in co-operation with the control device of the robot.

10 Claims, 7 Drawing Sheets

(56) References Cited

U.S. PATENT DOCUMENTS

Figure 1:
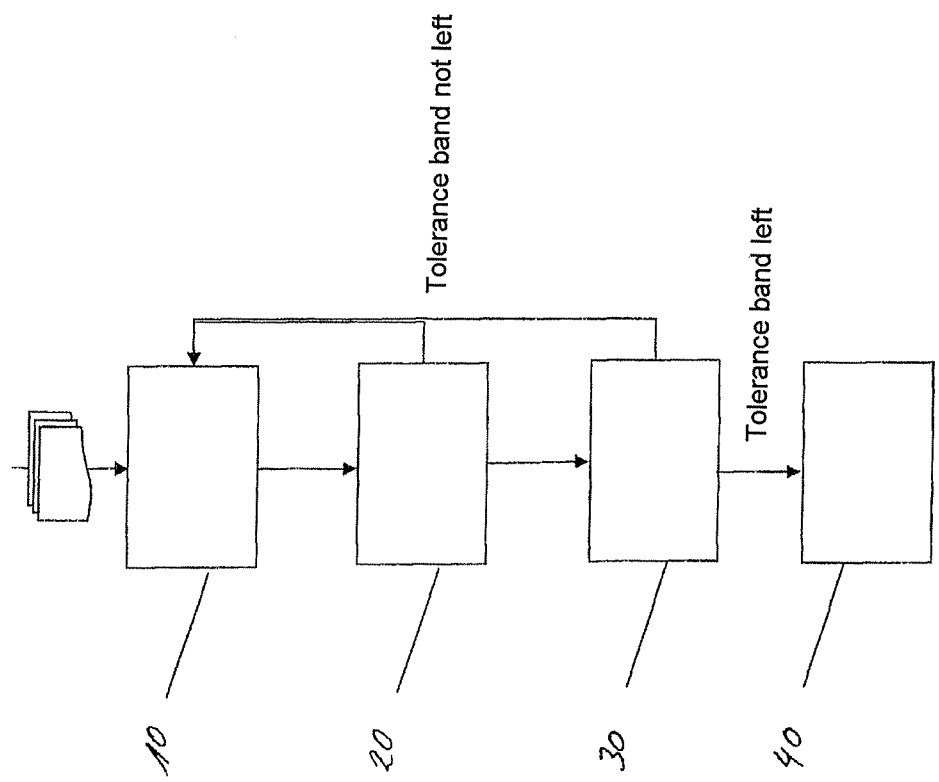

| | | | |
|---|---|---|---|
| 8,024,068 B2 * | 9/2011 | Gray | 700/252 |
| 2001/0032056 A1 * | 10/2001 | Tanaka et al. | 702/90 |
| 2002/0173878 A1 * | 11/2002 | Watanabe et al. | 700/245 |
| 2005/0043849 A1 * | 2/2005 | Coleman et al. | 700/195 |
| 2005/0246062 A1 * | 11/2005 | Keibel | 700/245 |

FOREIGN PATENT DOCUMENTS

| | | |
|---|---|---|
| EP | 0 428 748 B1 | 5/1990 |
| JP | 04 057691 A | 2/1992 |

OTHER PUBLICATIONS

* German Search Report.

* cited by examiner

| Zone 1 | Direction z | Tolerance z | Direction x | Tolerance x |
|---|---|---|---|---|
| | 0.7071 | ±10° | 0.0 | ±15° |
| | 0.0 | | 1.0 | |
| | -0.7071 | | 0.0 | |

| Zone 2 | Direction z | Tolerance z | Direction x | Tolerance x |
|---|---|---|---|---|
| | 0.0 | ±10° | 0.7071 | ±5° |
| | 0.0 | | -0.7071 | |
| | -1.0 | | 0.0 | |

Fig. 7

SYSTEM AND METHOD FOR ALIGNING AND FOR CONTROLLING THE POSITION OF A ROBOT TOOL

The invention relates to a system and a method for monitoring the alignment of a robot tool.

Robots that are used industrially are generally fitted with tools, which may be not only process tools for machining or assembly tasks, for example tools for polishing, milling, welding, separation, painting, adhesive bonding, in particular such as welding tongues or weld guns, painting guns, adhesive-bonding guns or else cutting burners, but also gripping tools in order to carry out predetermined tasks under program control.

Since some of these tools or accessories represent a major hazard potential to people and material in daily use, in particular as a result of the emission of hazardous or dangerous means or media, for example a laser beam or a high-pressure water jet, special safety-relevant aspects and questions must be taken into account when using such tools, and appropriate measures must be provided to minimize the danger and/or damage. This is particularly true in the case of robot movements with an activated tool, for example when the robot tool is approaching a workpiece to be machined.

In addition, in the case of known robot arrangements, in order to protect people and material against incorrect positions, orientations and/or alignments and/or movements of the activated robot tool which, for example, can lead to uncontrolled scanning of the working environment of the robot with the respective medium, and can thus cause considerable damage, boundaries or surrounds are required for the respective robot cell and/or the robot, which can withstand the energy of the means of the robot tool for a specific time and/or can absorb its energy for a specific time. These boundaries or surrounds result in additional technical complexity and financial cost, however, and represent a considerable cost factor relating to the installation of robots, in particular of industrial robots.

Against this background, the invention is based on the object of minimizing the installation effort for a robot, in particular an industrial robot, and of specifying a capability to efficiently monitor the orientation and/or alignment of a robot tool.

A system for carrying out the method according to the invention as well as advantageous refinements and developments of the invention are specified in further claims and in the following description.

In the method according to the invention for alignment, position and orientation monitoring of a robot tool, the alignment of the robot tool is determined, is compared with the reference direction and/or with tolerance values which are predetermined by the, in particular conical, tolerance band, and the respective robot tool is disconnected and/or deactivated on leaving the at least one tolerance band, automatically by means of measured-value recording and processing and taking account of at least one reference direction of the robot tool, and at least one predeterminable tolerance angle, which defines a tolerance band, in particular a tolerance band widening from a predetermined origin, around the at least one reference direction of the robot tool.

In an advantageous form of the method, a conical tolerance band is defined around the at least one reference direction of the robot tool. In principle, however, other geometries of the at least one widening tolerance band are also possible, depending on the coordinate system chosen, such as for example if Eulerian angles or quaternions are used to describe the robot movement, or if RPY (Roll Pitch Yaw) angles are used, differing from Eulerian angles in particular by the choice of the axes of rotation. For example, at least one conical tolerance band with an elliptical base area may also be defined.

Consideration of individual tolerance bands for each reference direction of the robot tool therefore avoids premature, unnecessary deactivation of the robot tool, and allows efficient monitoring of the tool alignment.

In one advantageous development of the method, on leaving the at least one tolerance band, not only is the appropriate robot tool disconnected and/or deactivated, but the movement of the robot is also stopped by means of a suitable control signal to the robot controller.

In particular, the reference direction of the robot tool runs along a coordinate axis, for example the Z axis, of a predeterminable fixed reference space of the robot working area, which is preferably associated with a Cartesian coordinate system with a corresponding origin. This coordinate system preferably corresponds to the so-called geographic coordinate system. In particular, the Cartesian coordinate system in this case defines a three-dimensional vector space.

In one advantageous refinement of the method, the alignment and/or position and orientation of the robot tool are/is determined by recording and processing of measured values relating to the robot-axis and/or motor positions of the robot.

In a further advantageous refinement of the method, not only is the alignment or orientation of the respective tool and/or accessory determined, but also its position.

In one advantageous development of the method, a warning message is also generated that is transmitted to the robot checking and/or control panel and/or to an optical and/or acoustic signal transmitter, for example a warning lamp, signal lamp, siren, horn or loudspeaker, if the position and orientation and/or alignment of the robot tool deviates by a predetermined percentage component from the reference direction within the tolerance band.

In a further advantageous refinement of the method, at least two reference directions are predetermined, each having a tolerance angle, with the respective accessory and/or tool being disconnected even on leaving and/or exceeding just one tolerance band which is defined by a tolerance angle. For example, this allows the definition and consideration of a second tool reference direction, such as the X-direction of the fixed reference system, together with a second tolerance angle, which defines, for example, a second cone.

In a further refinement of the method, the working area of the robot can be subdivided into at least two working area elements each having at least one reference direction with a tolerance angle, thus allowing the process to also take account of a plurality of locally distributed, different reference directions and/or tolerance angles, for example as required for a complex tool geometry. Different required tool orientations and/or alignments or positions are accordingly associated with the respective working area elements of the robot.

According to the method, the appropriate or suitable reference directions and/or references and/or tolerances are then selected automatically as a function of the position of the robot and/or of the robot tool in relation to the respective working area element, and therefore as a function of the position and/or on a position-resolved basis.

In a further advantageous refinement of the method, the reference and/or tolerance values can be varied and/or predetermined by external and/or internal checking devices and/or inputs.

In one advantageous development of the method, the alignment errors of the robot tool and/or accessory are determined with respect to the respective reference direction by forming the scalar product of the tool z vector in reference coordinates multiplied by the tool z reference vector in reference coordinates, and/or by forming the scalar product of the tool x vector in reference coordinates multiplied by the tool x reference vector in reference coordinates. This makes it possible to confirm that each tool is associated with a moving, preferably Cartesian or rectangular coordinate system with the three coordinate axes x, y, z and the vectors x, y, z which correspond to them and indicate the direction, following the movement and/or alignment of the robot tool and describing them with respect to the reference coordinate system. All the vectors are preferably quoted as unit vectors and/or their magnitudes are appropriately normalized in this case.

The scalar product of two unit vectors results in the cosine of the minimum included angle between the two vectors, which corresponds to half the opening angle of the cone which is formed when the vector corresponding to the current alignment rotates and/or precesses about the vector of the predetermined reference direction.

According to the method, no further time-consuming trigonometric operations and/or calculations are therefore required for the cosine, which is in each case stored such that it can be called up, of the angle between the reference vector and the corresponding tolerance vector, and/or for the cosine, which is stored such that it can be called up, of half the opening angle of the conical tolerance band.

In one alternative refinement of the invention, the tool alignment, position and/or orientation are/is quoted in quaternions, with quaternions representing four-dimensional division algebra over the body of the real numbers with non-commutative multiplication. As four-dimensional real algebra, the quaternions form a four-dimensional real vector space. Each quaternion is accordingly defined uniquely by four real components $x_0, x_1, x_2, x_3$. Four mutually perpendicular elements of unit length are chosen as basic elements for this vector space, and are referred to as 1,i,j,k. The linear combination of the four components with the four basic elements is accordingly:

$$x_0 + x_1 i + x_2 j + x_3 k$$

In this case R is embedded as an element in the form $x_0$ that is to say for $x_1 = x_2 = x_3 = 0$.

The quaternions are accordingly first of all converted to unit vectors and are then appropriately processed further, as explained above.

In one advantageous development of the invention, feedback is provided if the stated and/or converted vectors are not unit vectors, and/or the stated Z vector is not at right angles to the x vector.

Other possible ways to specify tool reference directions include, for example, teaching methods, off-line programming and/or virtual reality.

The system according to the invention for alignment, position and orientation monitoring of a robot tool has a monitoring device with a measured-value recording unit and a processing unit, with the monitoring device interacting via at least one interface with the checking device of the robot, and automatically determining the alignment of the robot tool by means of the measured-valve recording unit on the basis of recorded measured data, taking into account at least one predeterminable reference direction of the robot tool and at least one predeterminable tolerance angle which defines, in particular, a conical tolerance band around the at least one reference direction of the robot tool and the processing unit comparing the determined alignment with the reference direction and/or with the tolerance values predetermined by the, in particular conical, tolerance band, and, in conjunction with the checking device of the robot, disconnects and/or deactivates the respective robot tool on leaving the at least one tolerance band.

The invention as well as advantageous refinements will be described further with reference to a number of figures and exemplary embodiments.

Figure 2:
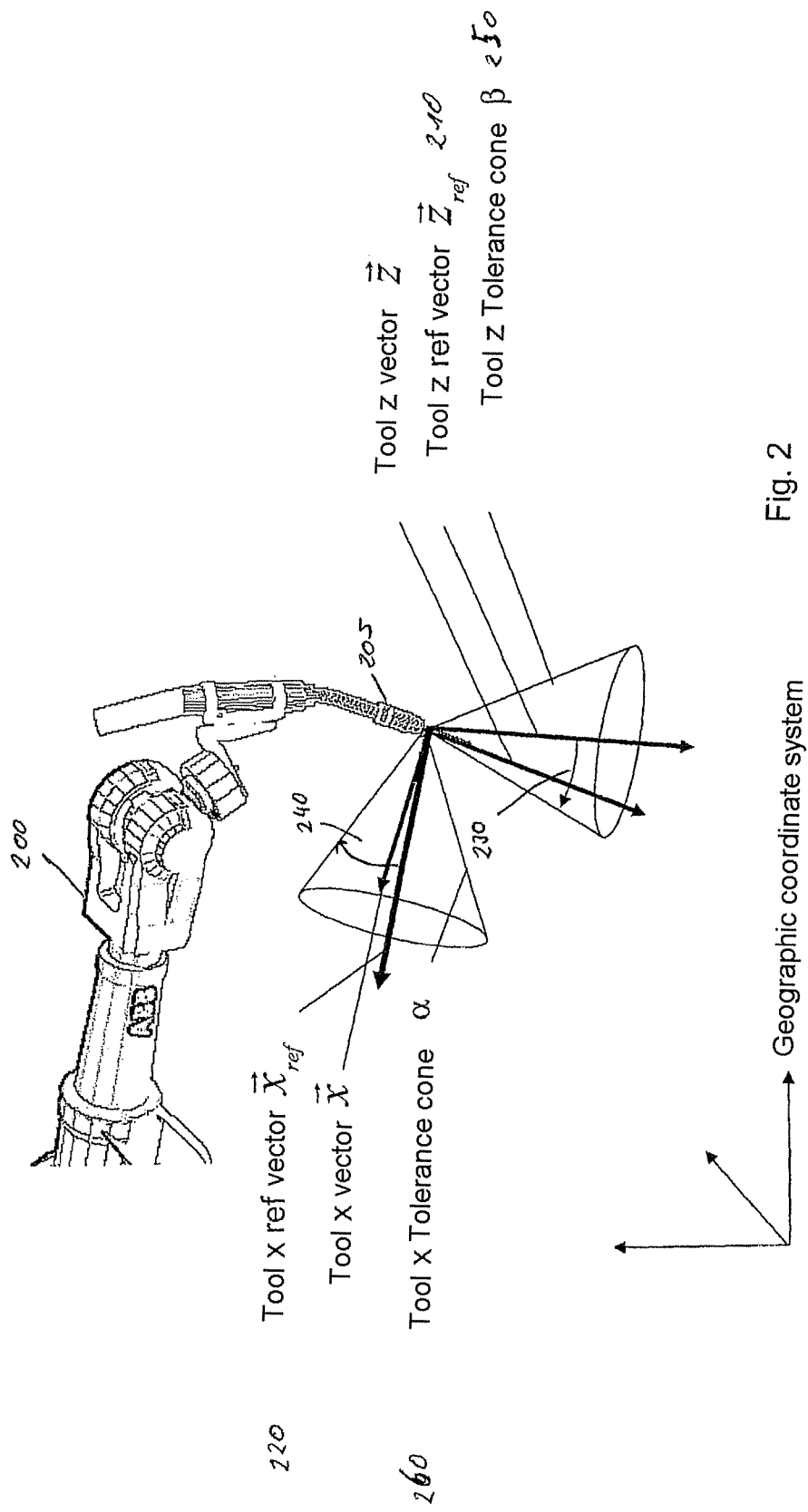
Figure 3:
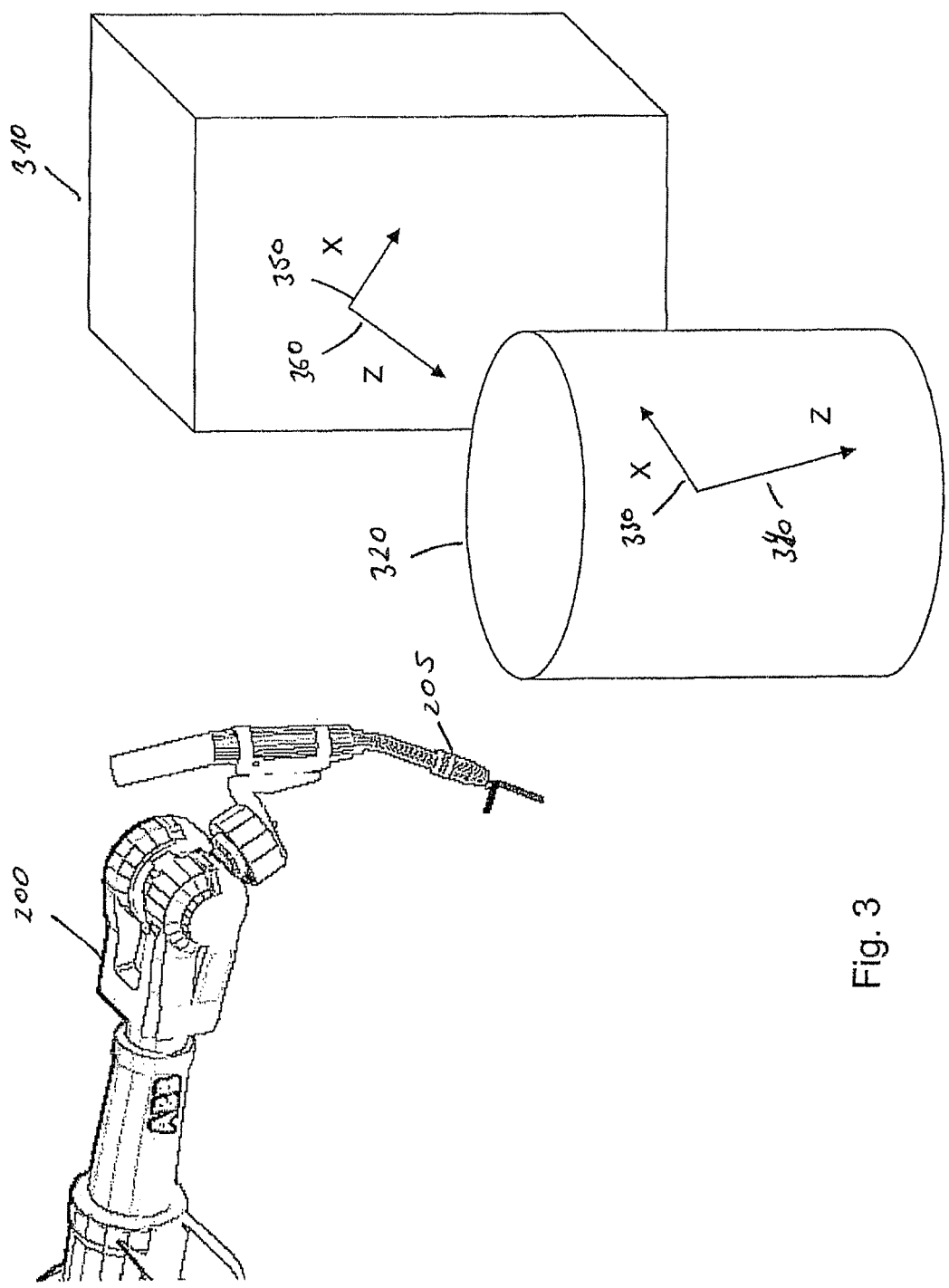
Figure 4:
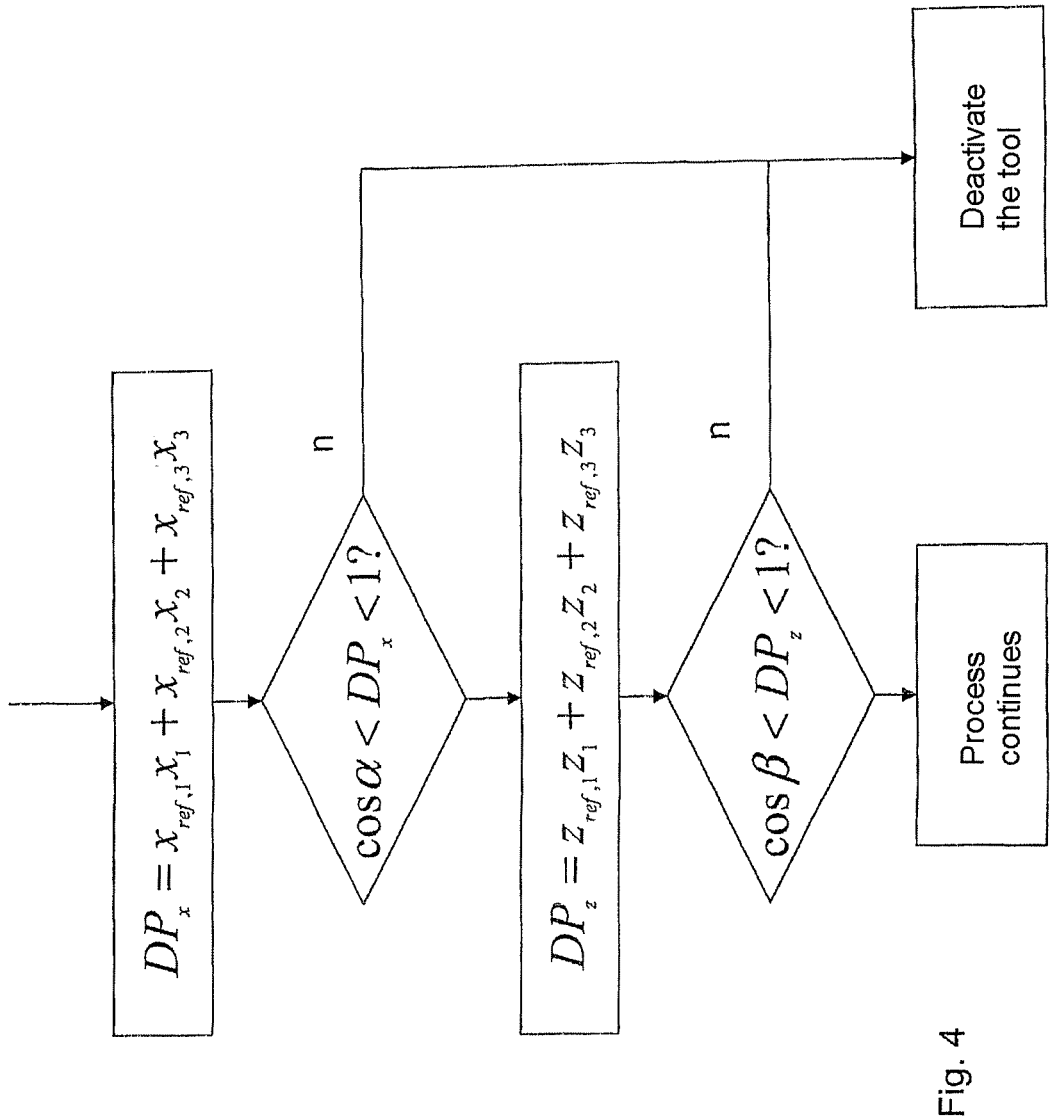
Figure 5:
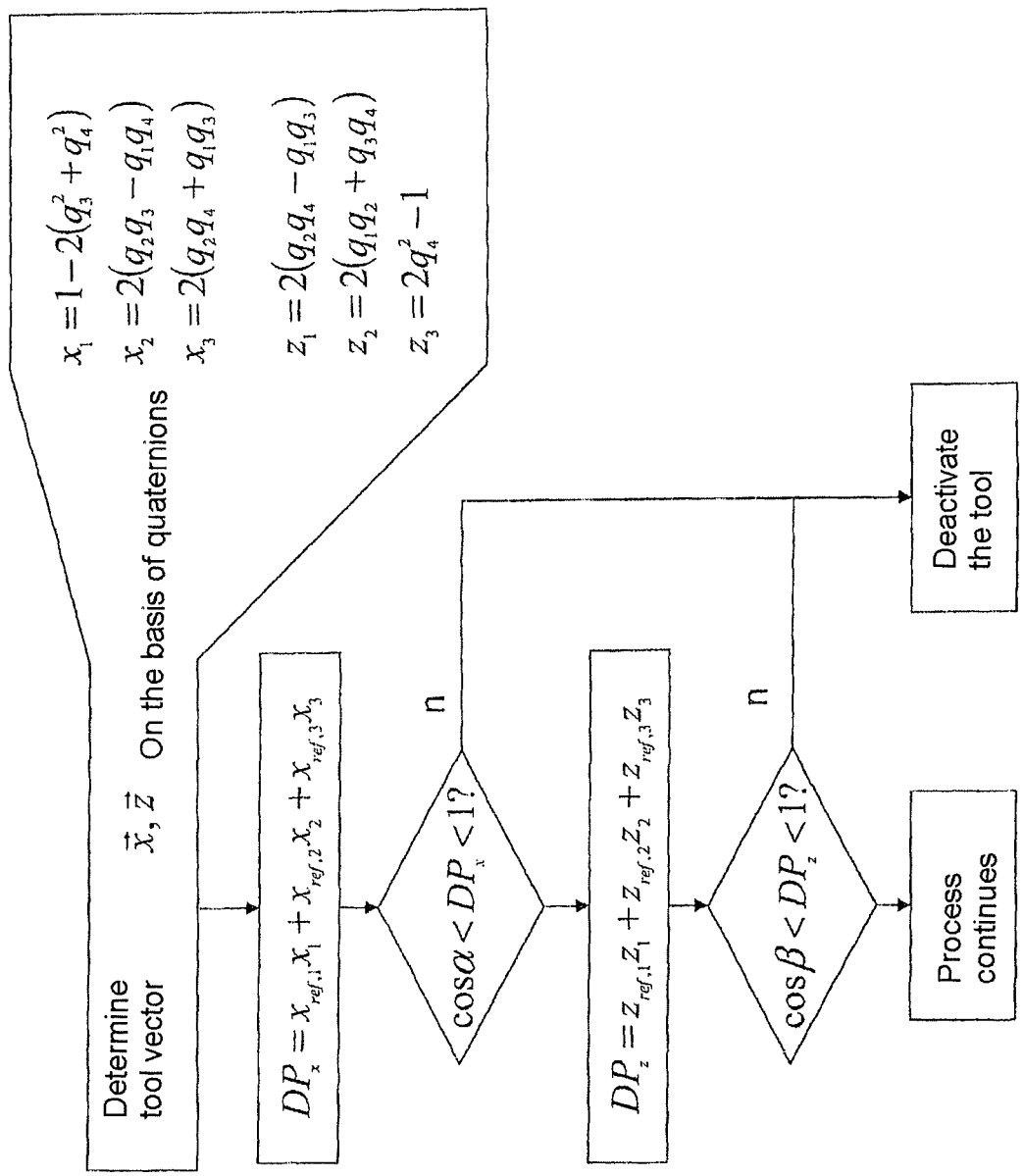
Figure 6:
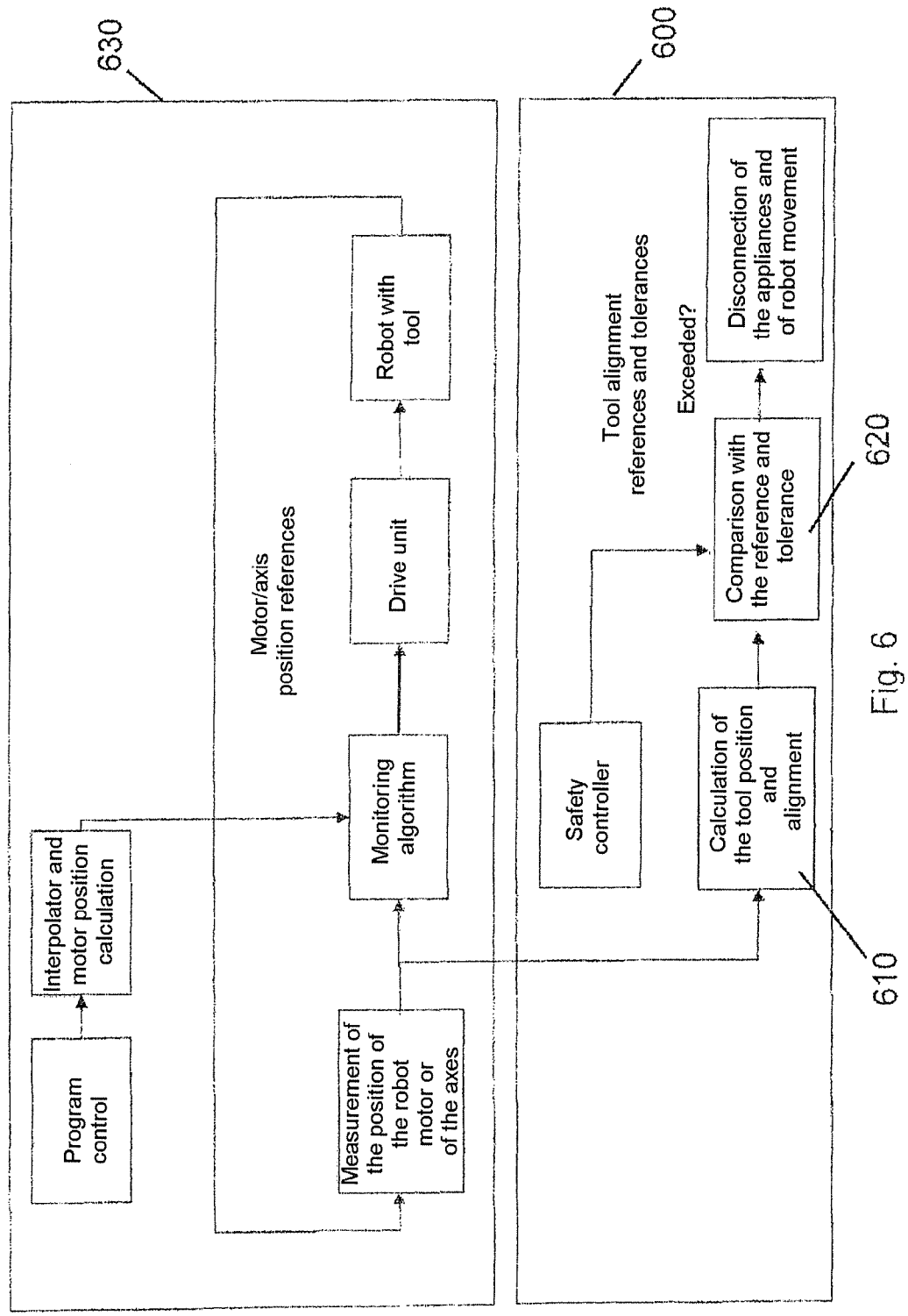

In the figures:

FIG. 1 shows an example of a method procedure for alignment, position and orientation monitoring of a robot tool, FIG. 2 shows an example of a robot with a tool and two reference directions, each with a tolerance angle, FIG. 3 shows an example of a robot with a tool, with the working area subdivided into two working area elements, each having two predetermined reference directions, FIG. 4 shows an example of a calculation scheme for determining alignment errors, FIG. 5 shows an example of a calculation scheme for determining alignment errors as in FIG. 4, but using quaternions, FIG. 6 shows an example of a system for alignment, position and orientation monitoring of a robot tool, and FIG. 7 shows an example of an input option.

FIG. 1 shows an example of a method procedure for alignment, position and orientation monitoring of a robot tool in which the alignment of the robot tool as well as its position are determined automatically, in a first method step 10, on the basis of recorded measured values relating to the robot-axis and/or motor positions of the robot, taking account of reference directions, recorded in preparation for the method, of the robot tool, as well as predetermined tolerance angles which each define a conical tolerance band around the respective reference direction of the robot tool.

The reference direction of the robot tool in this case preferably runs along a coordinate axis of a predeterminable fixed reference space of the robot working area. The fixed reference space is in this case based on a Cartesian coordinate system which defines a three-dimensional vector space.

The determined alignment is compared in a second method step 20 with the respectively predetermined reference direction and/or with the tolerance values predetermined by the conical tolerance band.

In this case, alignment errors and/or discrepancies of the robot tool are preferably determined with respect to the respective reference direction such that the scalar product of the tool z vector in reference coordinates multiplied by the tool z reference vector in reference coordinates, and/or the scalar product of the tool x vector in reference coordinates multiplied by the tool x reference vector in reference coordinates are/is formed. In this case, the tool is associated with a moving, Cartesian or rectangular coordinate system with the three coordinate axes x, y, z and/or vectors X,Y,Z which correspond to them and indicate the direction, following the movement and/or alignment of the robot tool and describes them, in relation to the reference coordinate system X,Y,Z. All the vectors are in this case preferably quoted as unit vectors and/or their magnitudes are appropriately normalized. The scalar product of two unit vectors results in the cosine of the minimum included angle between the two vectors which corresponds to half the opening angle of the cone which is formed when the vector which corresponds to the current alignment rotates and/or precesses about the vector of the predetermined reference direction.

The cosine of the angle between the reference vector and the corresponding tolerance vector and/or the cosine of half the opening angle of the conical tolerance band are advantageously determined and stored in an intermediate step so that they or it can be called up at any time in the course of the method and there is accordingly no need for any further time-consuming trigonometric operations and/or calculations. An appropriate calculation scheme with a check is shown in FIG. 4.

In a third method step 30, a warning message is generated and is transmitted to a robot checking device and/or to an optical and/or acoustic signal transmitter, in particular a warning lamp, signal lamp, siren, horn or loudspeaker, if the position, orientation and/or alignment of the robot tool deviate or deviates by a predetermined percentage component from the respective reference direction within the tolerance band.

If at least one tolerance band is left, then the respective robot tool and the robot are disconnected and deactivated in a fourth step 40, in conjunction with the robot checking device.

Reference and/or tolerance values recorded in preparation for the method can in this case be varied by means of external and/or internal checking devices and/or inputs.

The first and second method steps may in this case be carried out cyclically continuously or cyclically at discrete time intervals.

The method ends when a tolerance band is left and the robot tool is deactivated and/or the method is manually interrupted or ended.

FIG. 2 shows an example of a robot 200 with a tool 205 and two predetermined reference directions 210, 220, each having a respective tolerance angle 230, 240, with the respective robot tool 205 and/or robot 200 being disconnected when just one tolerance band 250, 260 which is defined by a tolerance angle 230, 240 is left and/or exceeded.

As can be seen by way of example in FIG. 3, the working area of the robot 200 can be subdivided on the basis of the method into two or more working area elements 310, 320 each having at least one reference direction 330, 340, 350, 360, as well, in which case a plurality of locally distributed different reference directions 330, 350 and/or tolerance angles can then be taken into account so that the respective working area elements 310, 320 of the robot 200 can be associated with different required tool orientations, and/or alignments and/or positions. With subdivisions such as this, the appropriate or suitable reference directions 330, 340, 350, 360 and/or references and/or tolerances can be selected automatically as a function of the position of the robot 200 and/or of the robot tool 205 in relation to the respective working area element 310, 320, and therefore as a function of the position and/or on a position-resolved basis.

FIG. 4 shows a calculation scheme for determining the scalar product $DP_z$ of the tool z vector in reference coordinates multiplied by the tool z reference vector in reference coordinates, and the scalar product $DP_x$ of the tool x vector in reference coordinates multiplied by the tool x reference vector in reference coordinates. Both scalar products are successively compared with the cosine of the corresponding half cone opening angle $\alpha$, $\beta$. If the scalar product is within the respective range, the alignment of the tool is within the permissible tolerances. In addition, if just one scalar product is outside the appropriate range, then the tool is deactivated.

FIG. 5 shows the calculation scheme from FIG. 4 but in this case based on the tool alignment, position and orientation being quoted in quaternions. The quaternions are accordingly first converted to unit vectors and are then appropriately processed further, as explained above (see FIG. 4).

FIG. 6 shows an example of a system for alignment, position and orientation monitoring of a robot tool, with a monitoring device 600 with a recording unit 610 and a processing unit 620 being provided, which interacts with the checking device 630 of the robot 200 and automatically determines the alignment of the robot tool by means of the recording unit 610, taking into account at least one predeterminable reference direction of the robot tool and at least one predeterminable tolerance angle which defines a conical tolerance band around the at least one reference direction of the robot tool 205 and the processing unit 620 compares the determined alignment with the predeterminable reference direction and/or with the tolerance values predetermined by the conical tolerance band, and/or, in conjunction with the monitoring device 630 of the robot 200, disconnects and/or deactivates the respective robot tool 205 on leaving the at least one tolerance band. It is also feasible for the processing unit 620 to stop the movement of the robot 200 on leaving the at least one tolerance band. The monitoring device 600 determines the alignment, position and/or orientation of the robot tool 205 on the basis of measured values relating to the robot-axis and/or motor positions of the robot 200, in which case the position of the respective robot tool 205 and/or accessory can also be determined. The monitoring device 600 is designed to generate a warning message and to transmit this to the robot checking device 630 and/or to an optical and/or acoustic signal transmitter which is provided for this purpose, in particular a warning lamp, signal lamp, siren, horn or loudspeaker, if the position, orientation and/or alignment of the robot tool deviates by a predetermined percentage component from the respective reference direction within the tolerance band.

In addition, at least two reference directions, each having one tolerance angle, can be predetermined, with the monitoring device 630 disconnecting the respective robot tool 205 on leaving and/or exceeding even just one tolerance band which is defined by a tolerance angle.

The monitoring device 600 is designed to subdivide the working area of the robot 200 as required and/or in accordance with a requirement into at least two working area elements each having at least one reference direction with a tolerance angle, with a plurality of locally distributed, different reference directions and/or tolerance angles then being taken into account.

The geometry, size, position, orientation and arrangement of the various working area elements are in this case freely variable. If two or more working area elements overlap, then all the applicable tolerance bands must be taken into account and complied with in the overlap area. This applies both to the system and to the method.

The monitoring device 630 automatically selects the appropriate or suitable reference directions and/or references and/or tolerances as a function of the position of the robot 200 and/or of the robot tool 205 in relation to the respective working area element, and therefore as a function of the position and/or on a position-resolved basis.

Furthermore, an input apparatus can be provided with appropriate input options, as shown in FIG. 7, in order to record and/or to vary reference and/or tolerance values and/or directions, even for a plurality of working area elements.

The monitoring device determines alignment areas and/or discrepancies of the robot tool with respect to the respective reference direction in accordance with the method, preferably by scalar product formation and subsequent comparison.

The invention claimed is:

1. A method for alignment, position and orientation monitoring of a robot tool, wherein the alignment of the robot tool is determined, is compared with a reference direction and with tolerance values which are predetermined by a tolerance band, and the robot tool is at least one of disconnected and deactivated on leaving the at least one tolerance band, automatically by measured-value recording and processing units and taking account of at least one predeterminable reference direction of the robot tool, and at least one predeterminable tolerance angle, which defines the tolerance band around the at least one reference direction of the robot tool, wherein at least two reference directions are predetermined, each having a tolerance angle, with the respective robot tool being disconnected even on leaving and/or exceeding just one tolerance band which is defined by a tolerance angle.

2. A method for alignment, position and orientation monitoring of a robot tool, wherein the alignment of the robot tool is determined, is compared with a reference direction and with tolerance values which are predetermined by a tolerance band, and the robot tool is at least one of disconnected and deactivated on leaving the at least one tolerance band, automatically by measured-value recording and processing units and taking account of at least one predeterminable reference direction of the robot tool, and at least one predeterminable tolerance angle, which defines the tolerance band around the at least one reference direction of the robot tool, wherein a working area of the robot is subdivided into at least two working area elements each having at least one reference direction with a tolerance angle, with a plurality of locally distributed, different reference directions and/or tolerance angles then being taken into account.

3. The method as claimed in claim 2, wherein various required tool orientations and/or alignments and/or positions are associated with the respective working area elements of the robot.

4. The method as claimed in claim 3, wherein the tool alignment and/or position and orientation are/is quoted in quaternions.

5. The method as claimed in claim 2, wherein the appropriate or suitable reference directions and/or references and/or tolerances are selected automatically as a function of the position of the robot and/or of the robot tool in relation to the respective working area element, and therefore as a function of the position and/or on a position-resolved basis.

6. A system for alignment, position and orientation monitoring of a robot tool, with a monitoring device being provided which has a recording unit and a processing unit, interacts with a checking device of the robot and automatically determines the alignment of the robot tool by the recording unit, taking into account at least one predeterminable reference direction of the robot tool and at least one predeterminable tolerance angle which defines a tolerance band around the at least one reference direction of the robot tool and the processing unit compares the determined alignment with the predeterminable reference direction and/or with tolerance values predetermined by the defined tolerance band, and/or, in conjunction with the checking device of the robot, at least one of disconnects and deactivates the robot tool on leaving the at least one tolerance band;

wherein at least two reference directions are predetermined, each having a tolerance angle, with the respective robot tool being disconnected by the monitoring device on at least one of leaving and/or exceeding just one tolerance band which is defined by a tolerance angle.

7. A system for alignment, position and orientation monitoring of a robot tool, with a monitoring device being provided which has a recording unit and a processing unit, interacts with a checking device of the robot and automatically determines the alignment of the robot tool by the recording unit, taking into account at least one predeterminable reference direction of the robot tool and at least one predeterminable tolerance angle which defines a tolerance band around the at least one reference direction of the robot tool and the processing unit compares the determined alignment with the predeterminable reference direction and/or with the tolerance values predetermined by the defined tolerance band, and/or, in conjunction with the checking device of the robot, at least one of disconnects and deactivates the robot tool on leaving the at least one tolerance band;

wherein the monitoring device subdivides a working area of the robot, depending on a requirement, into at least two working area elements each having at least one reference direction with a tolerance angle, with a plurality of locally distributed, different reference directions and/or tolerance angles then being taken into account.

8. The system as claimed in claim 7, wherein various required tool orientations and/or alignments and/or positions are associated with the respective working area elements of the robot.

9. The system as claimed in claim 7, wherein the monitoring device automatically selects the appropriate or suitable reference directions and/or references and/or tolerances as a function of the position of the robot and/or of the robot tool in relation to the respective working area element, and therefore as a function of the position and/or on a position-resolved basis.

10. The system as claimed in claim 9, wherein an input apparatus is provided in order to record and/or vary reference and/or tolerance values.

* * * * *